(12) United States Patent
Pedersen et al.

(10) Patent No.: US 9,438,418 B1
(45) Date of Patent: Sep. 6, 2016

(54) SYSTEMS AND METHODS FOR GENERATING A KEY DIFFICULT TO CLONE

(75) Inventors: Bruce B. Pedersen, Sunnyvale, CA (US); Ninh D. Ngo, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 479 days.

(21) Appl. No.: 13/102,673

(22) Filed: May 6, 2011

(51) Int. Cl.
*H04L 9/08* (2006.01)
*H04L 29/06* (2006.01)
*H04L 9/14* (2006.01)

(52) U.S. Cl.
CPC ......... H04L 9/0861 (2013.01); H04L 63/0478 (2013.01); *H04L 9/14* (2013.01)

(58) Field of Classification Search
USPC .................................. 380/46, 44, 277, 45, 47
IPC .............. H04L 9/0822,2209/04, 2209/12, 9/14, H04L 9/0861, 63/0478, 9/0836
See application file for complete search history.

(56) References Cited

U.S. PATENT DOCUMENTS

| | | | |
|---|---|---|---|
| 7,219,237 B1 * | 5/2007 | Trimberger | 713/193 |
| 7,747,025 B1 * | 6/2010 | Trimberger | 380/284 |
| 7,757,294 B1 | 7/2010 | Simkins | |
| 7,834,652 B1 * | 11/2010 | Tang et al. | 326/8 |
| 8,363,833 B1 * | 1/2013 | Streicher | H04L 9/0631 380/44 |
| 2005/0141519 A1 * | 6/2005 | Rajgopal et al. | 370/395.32 |
| 2006/0136717 A1 * | 6/2006 | Buer et al. | 713/155 |
| 2010/0183154 A1 * | 7/2010 | Graunke | H04L 9/0891 380/278 |
| 2014/0247944 A1 * | 9/2014 | Kocher | G06F 21/602 380/286 |

OTHER PUBLICATIONS

A versatile framework for FPGA field updates: an application of partial self-reconfiguration, Fong et al, IEEE, 2003.*
A new approach to compress the configuration information of programmable devices, Martina et al, IEEE, 2006.*

* cited by examiner

*Primary Examiner* — Luu Pham
*Assistant Examiner* — Jahangir Kabir
(74) *Attorney, Agent, or Firm* — Fletcher Yoder, P.C.

(57) ABSTRACT

Systems and methods relating to generating a key that is difficult to clone are described. The methods include receiving a programmable logic device (PLD) with a first key and applying a one-way hash function to a second key or the first key and the second key to create a third key. The application of the one-way hash function is performed using one or more components hardwired into the PLD. The methods further include storing the third key in the PLD only after using the one or more components to apply the one-way hash function.

11 Claims, 8 Drawing Sheets

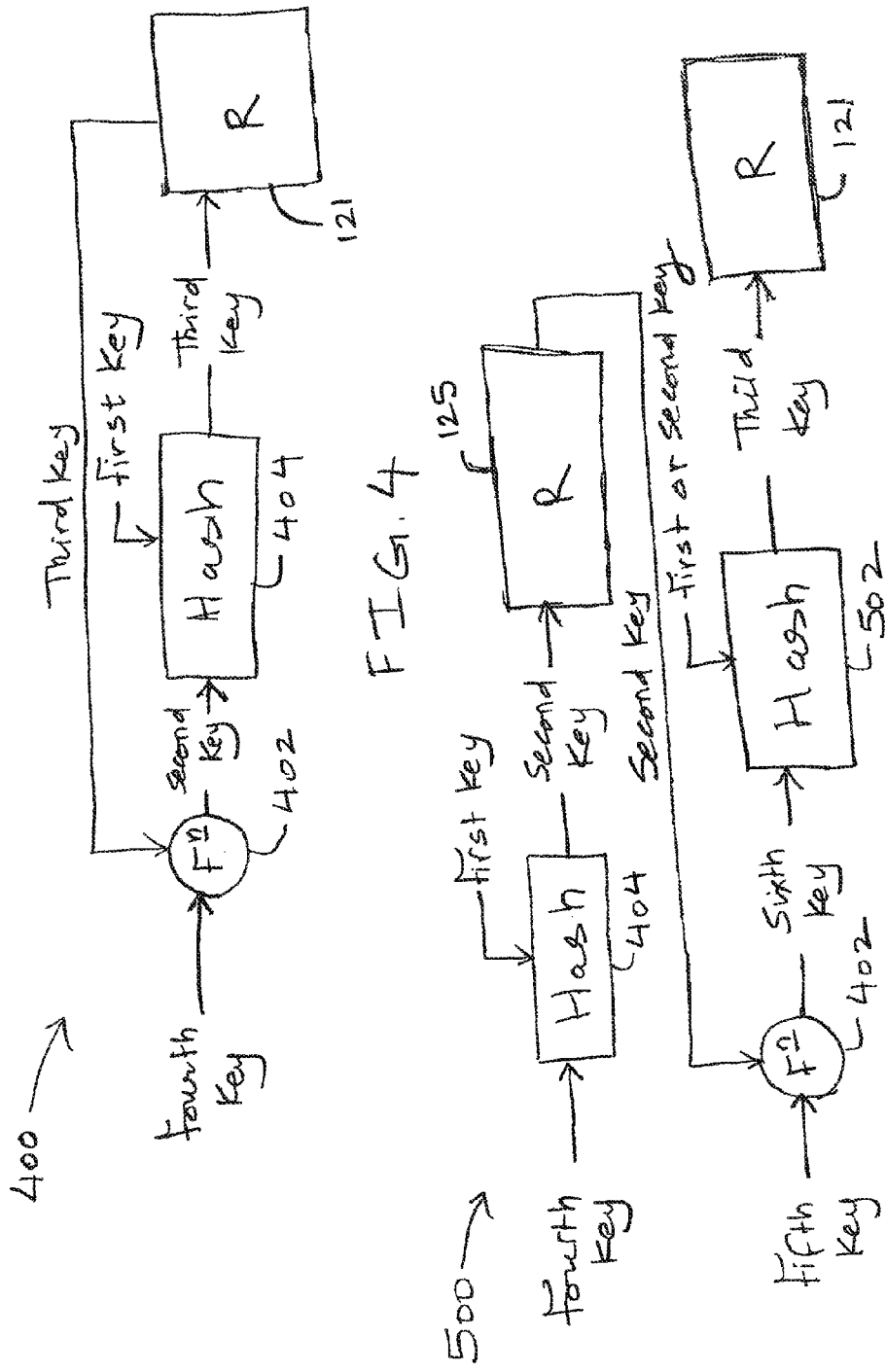

US 9,438,418 B1

SYSTEMS AND METHODS FOR GENERATING A KEY DIFFICULT TO CLONE

FIELD OF THE INVENTION

The present disclosure generally relates to systems and methods for generating a key difficult to clone.

BACKGROUND

A programmable logic device (PLD) may be configured with data to provide a user-defined function. This data may be referred to as a configuration bitstream or program object file (POF). This bitstream programs the PLD to perform multiple digital or analog functions.

The PLD may contain configurable fabric that includes hundreds of thousands of logic gates, as well as embedded processors, stand-alone microprocessors, memories, dedicated analog function blocks, state machines, and/or other circuits. The configurable fabric is part of the PLD that can be programmed by a user via the bitstream to incorporate a user design.

The bitstream is an outcome of a huge investment in manpower and research and development costs, often in the million dollar range. To protect this investment, the bitstream is often encrypted with an encryption key. The encrypted bitstream is decrypted using a decryption key stored on the PLD, and the PLD is then configured.

Unfortunately, problems remain even with encryption. For example, if the decryption key can be determined, for example, by examining the PLD, the bitstream can be copied and the PLD can be cloned to engage in gray market sales of the clones.

SUMMARY OF THE INVENTION

Systems and methods relating to generating a key that is difficult to clone are described. The methods includes applying a one-way hash function to a programmable logic device (PLD) key, e.g., a first key and a second key, or to the second key, etc., to create a third key. The PLD includes one or more key registers in which the third key is stored. The application of the one-way hash function is performed using one or more components hardwired into the PLD. The only way to access the one or more registers is to load the one or more registers with the third key after the one-way hash function is applied.

An unauthorized user may engage in gray market sales of the PLD and attempt to store the third key in the one or more key registers. However, the unauthorized user cannot store the third key in the one or more key registers because the third key can be stored in the one or more key registers only after applying the one-way hash function. As such, the unauthorized user cannot apply the one-way hash function because only the one or more components can apply the one-way hash function.

Moreover, even if the unauthorized user is able to reverse engineer the third key, the unauthorized user cannot store the third key into the one or more key registers because the unauthorized user does not know the value of the second key and the second key is used to generate the third key. Furthermore, the unauthorized user cannot determine the value of the second key from the third key because the third key is generated by applying the one-way hash function to the second key. Hence, the unauthorized user cannot store the third key in the one or more key registers to engage in gray market sales of the PLD.

BRIEF DESCRIPTION OF THE DRAWINGS

The systems and methods for generating a key difficult to clone may best be understood by reference to the following description taken in conjunction with the accompanying drawings, which illustrate various embodiments of the present systems and methods. In the drawings, structural elements having the same or similar functions are denoted by like reference numerals.

FIG. 4 is an exemplary system for generating the third key used within the method of FIG. 3 in accordance with one embodiment of the present invention.

FIG. 5 is another exemplary system for generating the third key in accordance with another embodiment of the present invention.

DETAILED DESCRIPTION

Figure 1:
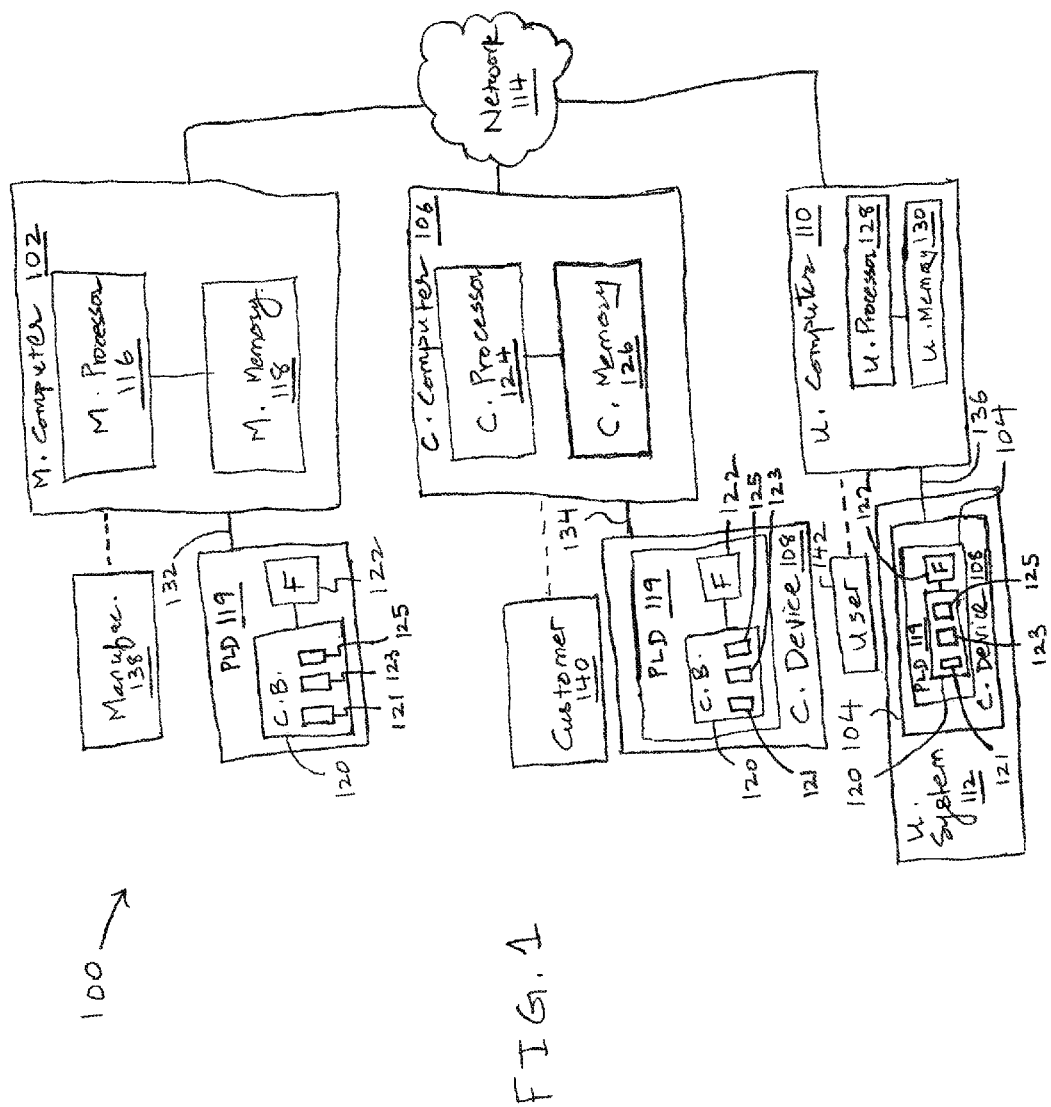
FIG. 1 is an exemplary system for generating a first key, a second key, and a third key, which is difficult to clone, in accordance with one embodiment of the present invention.

As shown in FIG. 1, a system 100 includes a manufacturer computer 102, a programmable logic device (PLD) 119, a customer computer 106, a customer device 108, a user computer 110, a user system 112, and a network 114. In various embodiments, manufacturer computer 102 may include a manufacturer processor 116 and a manufacturer memory 118. As used herein, the term processor may refer to a central processing unit (CPU), a microprocessor, a floating point coprocessor, a graphics coprocessor, a hardware controller, a microcontroller, a programmable logic device programmed for use as a controller, a network controller, or other processing unit.

PLD 119 may be a field programmable gate array (FPGA), an application specific PLD (ASIC), or a custom ASIC. The PLD 119 may be a single integrated circuit or a system composed of multiple integrated circuits. PLD 119 may include a control block 120, which includes a controller. The controller may include a state machine, one or more key registers 121, 123, and 125. The one or more key registers 121, 123, and 125 are non-programmable and non-volatile when incorporated in a first field of use or a second field of use, both of which are described below.

PLD 119 may further include a configurable fabric 122, which may include one or more registers and/or one or more configuration random access memory (CRAM) cells. The configurable fabric 122 may be programmable or re-programmable when PLD 119 is incorporated in the first field of use or the second field of use. The CRAM cells may be included within static RAMs (SRAMs), dynamic RAMs (DRAMs), electrically erasable RAMs, and optically erasable RAMs, latches incorporated in complementary metal-oxide-semiconductor (CMOS) technology, flip-flops incorporated in CMOS, fuses, antifuses, or some other volatile or non-volatile storage technology or mechanism. The SRAM may be battery-backed. The CRAM cells may control or define behavior of various state machines, digital or analog circuit blocks, and/or input/output (IO) elements in the PLD 119. The CRAM cells may control or define routing of signals between the state machines, the digital or analog circuit blocks, and/or the IO elements. The CRAM cells may be used to configure the PLD 119 based on a user design that is incorporated in the configurable fabric 122.

Customer device 108 may include a video game console, a server, a router, a cellular phone, and a computer. Moreover, customer computer 106 may include a customer processor 124 and a customer memory 126. User computer 110 may include a user processor 128 and a user memory 130. Memory 118, 120, or 130 may be a RAM, a read-only memory (ROM), or a combination of the RAM and ROM. Network 114 may be the Internet, an Intranet, or a combination of the Internet and one or more Intranets. Network 114 may include a wired network, a wireless network, or a combination of the wired network and wireless network. User system 112 may be a network, such as network 114, which includes customer device 108. For example, user system 112 may be a cellular network or a satellite network.

Manufacturer computer 102 may be connected with PLD 119 via a manufacturer communication link 132, which may apply a Joint Action Test Group (JTAG) standard or a standard built on top of the JTAG standard. Similarly, customer computer 106 may be connected with PLD 119 via a customer communication link 134, which may apply the JTAG standard or the built on top standard. Moreover, user computer 110 may be connected with PLD 119 via a user communication link 136, which may apply the JTAG standard or the built on top standard.

A manufacturer 138, such as an entity or a person, may control manufacturer computer 102. Manufacturer 138 may manufacture PLD 119. A customer 140, such as an entity or a person, may control customer computer 106. Customer 140 is a customer of manufacturer 138 and may receive, with or without purchase, PLD 119 from manufacturer 138 for incorporating PLD 119 in customer device 108. Customer 140 may receive PLD 119 from manufacturer 138 with permission of manufacturer 138. For example, customer 140 may receive one or more rights to use, sell, and/or export PLD 119 in the first field of use from manufacturer 138 under a license agreement between the manufacturer 138 and customer 140. Customer 140 may generate configuration information, described below, used to configure the PLD 119.

Incorporating the PLD 119 within customer device 108 may enable a function of customer device 108. For example, incorporating the PLD 119 within a router device may enable the router to route data in a network 114. As another example, incorporating the PLD 119 within a video game console may enable one to play the video game on the video game console. The incorporation of PLD 119 within customer device 108 may be an example of the first field of use of the PLD 119.

A user 142, such as an entity or a person, may control user computer 110. The user 142 may receive, with or without purchase, customer device 108 and may incorporate customer device 108 within user system 112. For example, the user 142 may purchase a router from customer 140 and may incorporate the router within a computer network owned or leased by the user 142. As another example, user 142 may receive a satellite from customer 140 and may incorporate the satellite within a satellite network owned or leased by user 142. The incorporation of PLD 119 within user system 112 may be an example of the second field of use of the PLD 119.

In some embodiments, control block 120 is incorporated in hardware and cannot be programmed when incorporated in the first or second field of use. For example, anyone other than the manufacturer 138, such as customer 140 or user 142, cannot program control block 120.

In various embodiments, PLD 119 may be used by customer 140 without being incorporated within customer device 108. In some embodiments, PLD 119 may be used by user 142 without being incorporated within user system 112 or customer device 108.

Figure 2:
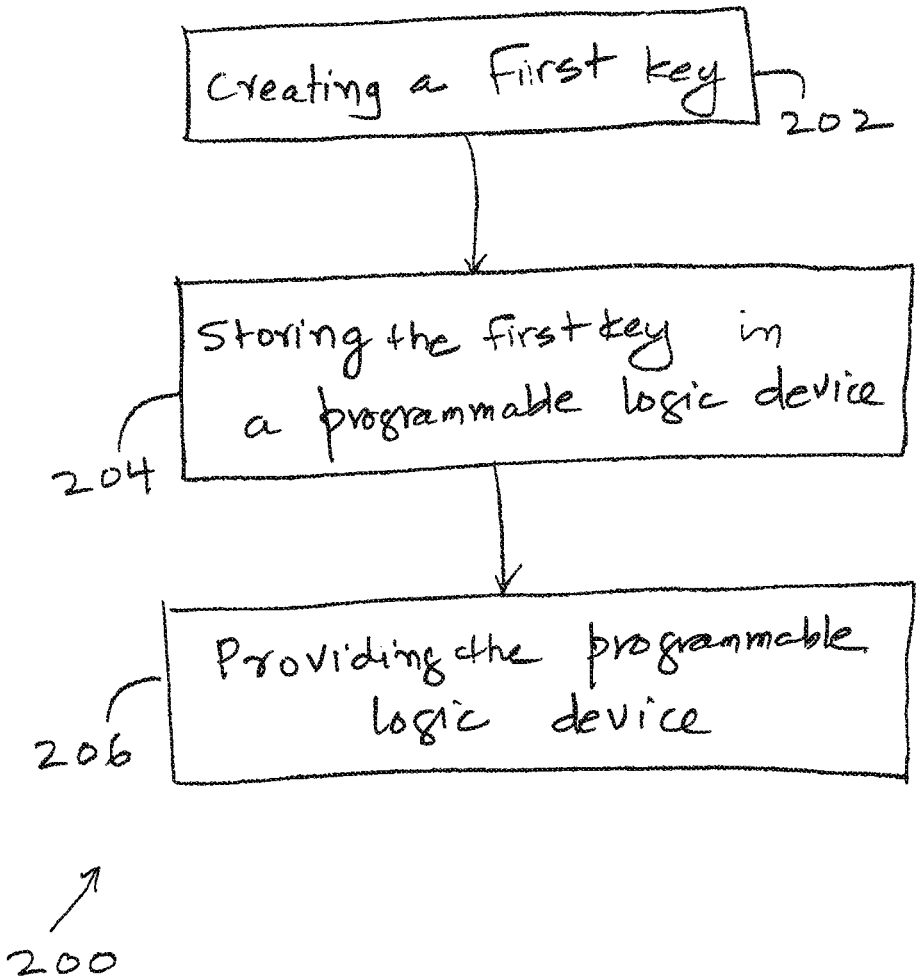
FIG. 2 is an exemplary method for generating the first key, in accordance with one embodiment of the present invention.

Referring to FIG. 2, a method 200 for generating a first key is described. At operation 202, manufacturer processor 116 may create the first key, which may be a private key or a public key. For example, manufacturer processor 116 may generate plaintext that may be subsequently encrypted to form ciphertext. As another example, manufacturer processor 116 may generate a constant, such as zero, one, or two, or generates a series of constants. In one embodiment, manufacturer processor 116 may receive the first key from manufacturer 138 via an input device, described below. In some embodiments, manufacturer processor 116 may create a different constant or a different series of constants for each family of PLDs including PLD 119 or for each member of the family of PLDs. For example, manufacturer processor 116 may create a constant $C_1$ for a family Stratix IV™ of PLDs made by Altera™ corporation and a constant $C_2$ for a family Stratix V™ of PLDs made by Altera™ corporation. As another example, manufacturer processor 116 may create a series $S_1$ of constants for a first member of a family of PLDs and may create a series $S_2$ of constants for a second member of the family of PLDs.

At step 204, manufacturer 138 may store the first key within the PLD 119. For example, manufacturer 138 may hardwire the first key within control block 120. Once the manufacturer 138 hardwires the first key within PLD 119, the first key is not programmable. As another example, manufacturer 138 uses manufacturer processor 116 to send the first key for storage in one or more key registers 121-125.

At operation 206, manufacturer 138 may provide PLD 119 having the first key to customer 140. For example, manufacturer 138 may sell the PLD 119 to customer 140. As another example, manufacturer 138 may provide the PLD 119 to customer 140 under a license agreement.

In one embodiment, manufacturer 138 creates a different series of constants for different classes of customers or for different customers. For example, manufacturer 138 creates a constant $C_3$ for a first customer and a constant $C_4$ for a second customer. As another example, manufacturer 138 creates a constant $C_5$ for a customer located at a first geographical location and a constant $C_6$ for a customer located at a second geographical location. As yet another example, manufacturer 138 creates a constant $C_7$ for a large size customer and a constant $C_8$ for a small size customer. The size of customer 140 may be measured in terms of various factors, such as, market capitalization, number of employees, revenues, profit margins, the number of PLDs purchased, etc. These different customers receive PLDs with different values of the first key. For example, customer 140 receives PLD 119 with the first key having a first value and another customer receives PLD 119 with the first key having a second value. Different values assigned to the first key for different customers prevents customer 140 from selling PLD 119 to another customer in a gray market.

Figure 3:
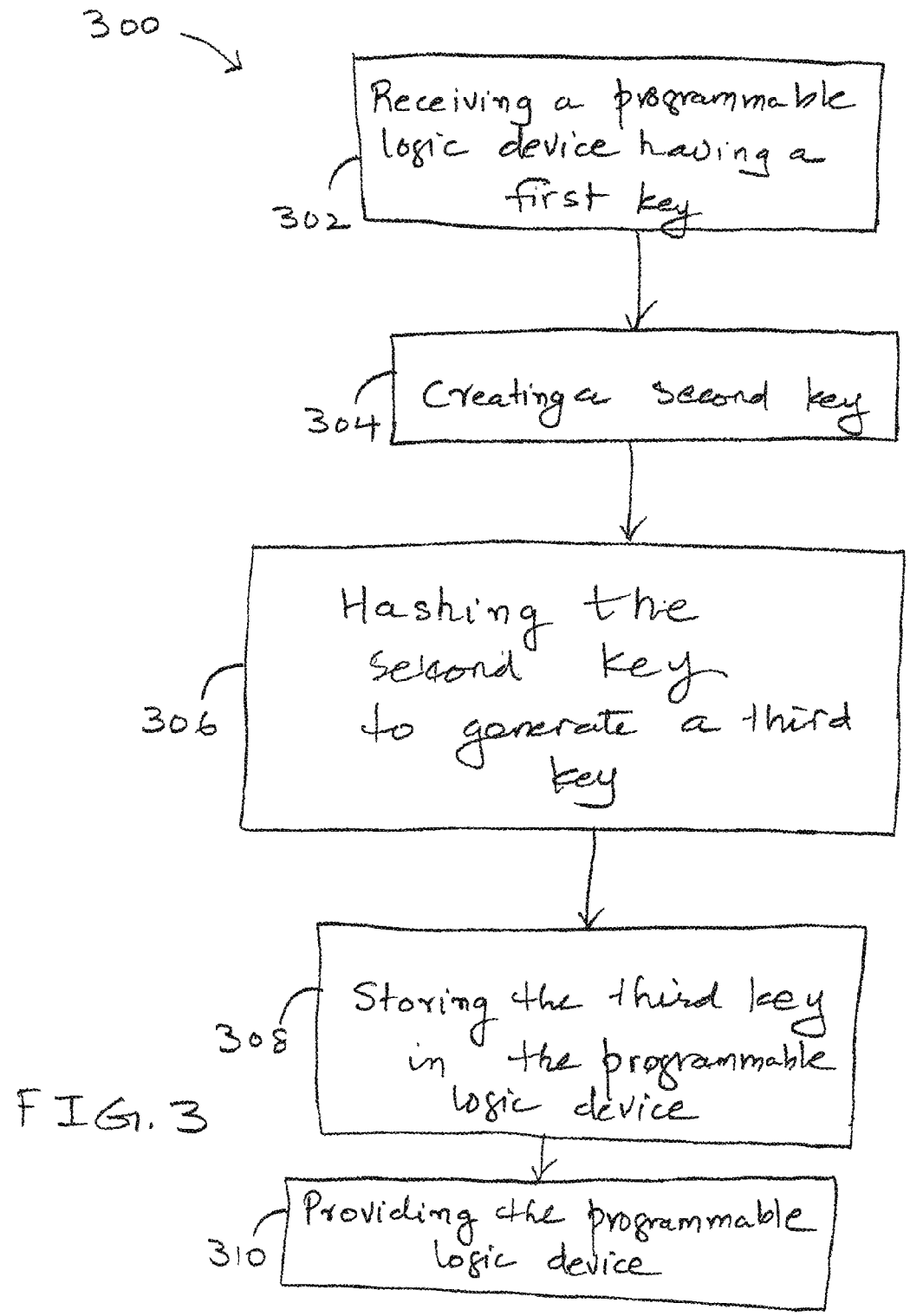
FIG. 3 is an exemplary method for generating the second and third keys in accordance with one embodiment of the present invention.

Referring to FIG. 3, a method 300 for generating a second key and a third key, which is difficult to clone, is described. At step 302, customer 140 may receive PLD 119 having the first key from manufacturer 138. At step 304, customer 140 may use customer computer 106 to create the second key. The second key may be a private key of customer 140. For example, the second key may be known only to customer 140 and may not be known to anyone other than customer 140, such as manufacturer 138 or user 142.

Upon connection, by customer 140, of PLD 119 with customer computer 106 via customer communication link 134, customer processor 124 may provide the second key to control block 120 via customer communication link 134. Control block 120 may receive the second key from customer communication link 134 via a first path of PLD 119 and at operation 306, may apply a one-way hash function to hash the second key to generate the third key. It is noted that the term 'path' as used herein may include one or more conductors hardwired in PLD 119. The one-way hash function may be Secure Hash Algorithm-1 (SHA-1), SHA-256, or another type of hash algorithm. In all embodiments, the first path and the control block 120 are hardwired into the PLD 119 by manufacturer 138. The one-way hash function may be performed within control block 120. Control block 120 may delete the second key after using the second key to generate the third key.

Furthermore, at operation 308, control block 120 may store the third key within the one or more key registers 121. The third key may be stored in control block 120 only after applying the one-way hash function. For example, an unauthorized user cannot store the third key within PLD 119 without knowing the value of the second key, which is known only to customer 140. At operation 310, customer 140 may provide, with or without selling, customer device 108 having the PLD 119 and the third key to user 142. When customer 140 provides the PLD 119 to user 142, the PLD 119 may be missing some configuration information and without the missing configuration information, the configurable fabric 122 of PLD 119 may not be configured and operational.

In some embodiments, control block 120 may apply the one-way hash function to the first and second keys to generate the third key. In one embodiment, control block 120 may encrypt or decrypt the first key with the second key to generate the third key.

In one embodiment, at operation 306, the control block 120 may apply the one-way hash function multiple times to the second key and other keys, such as the third key, to generate the third key. Each of the other keys may be generated during each iteration of the operation 306. For example, at operation 306, the control block 120 may apply the one-way hash function for a first time to the second key generate a first value of the third key. Again at operation 306, the one-way hash function may be applied to the first value for a second time to generate a second value of the third key.

It is noted that in some embodiments, a value of the third key may be loaded into PLD 119 by customer 140 prior to the customer device 108 to user 142. It is, however, appreciated that it is possible for customer 140 to load a different value of the third key into PLD 119 into PLD 119 after the PLD 119 has been provided to user 142. The different value may be generated by applying the one-way hash function to a value of the second key.

As shown in FIG. 4, a system 400 for generating the third key is described. The system 400 may include the first key, the second key, the third key, a fourth key, and a function 402 for combining the third key and fourth key. Function 402 may be incorporated within control block 120 and may be an exclusive OR (XOR) function, an exclusive NOR (XNOR) function, a hash function, etc. System 400 may further include a one-way hash function 404 that may be incorporated in control block 120. System 400 may also include one or more key registers 121.

Control block 120 may receive the fourth key from customer 140. For example, customer 140 may provide the fourth key via customer communication link 134 and via the first path for storing in control block 120. The fourth key may be provided for storage in control block 120 via an input device.

During a first iteration of a method for generating the third key executed by using system 400, control block 120 may initiate the third key to a third value, such as a constant or a series of constants, and store the first value within one or more key registers 121. During the first iteration, the control block 120 may apply function 402 to the third value and the fourth key to generate the second key. Control block 120 may hash, with the one-way hash function 404, the first key and the second key to generate a fourth value of the third key, and may replace the third value with the fourth value in one or more key registers 121. At subsequent iterations, the fourth value of the third key stored within one or more key registers 121 may be used to create a fifth value of the third key and so forth. The number of iterations for generating the value of the third key within control block 120 may be selected by the customer 140 via an input device.

It is appreciated that in one embodiment, the control block 120 may hash only the second key with the one-way hash function 404 to generate the fourth value of the third key. In some embodiments, the third key is stored in one or more key registers 121 only after applying the one-way hash function 404.

Referring to FIG. 5, a system 500 for generating the third key is described. The system 500 includes the fourth key, the one-way hash function 404, the second key, one or more key registers 121, a fifth key, the function 402, a sixth key, a one-way hash function 502, the third key, and the one or more key registers 125. One-way hash function 502 may be incorporated within control block 120.

Control block 120 may receive the fifth key from the customer 140. For example, customer 140 may use an input device of the customer computer 106 to provide the fifth key to be stored in configurable fabric 122. Control block 120 may apply hash function 404 to the fourth key and the first key to generate the second key, and may store the second key in one or more key registers 125. Control block 120 may access the second key from one or more key registers 125 and may apply function 402 to the second key and fifth key in order to generate the sixth key.

Control block 120 may hash, with one-way hash function 502, the sixth key and the first key or the sixth key and the second key to generate the third key or any combination thereof. The output of the one-way hash function 502 is the third key that may be stored within one or more key registers 121. It is noted that unlike system 400, one or more key registers 121 may not be re-written with a different value of the third key at each iteration of a method illustrated by using system 500.

In various embodiments, the third key may be stored within one or more key registers 121 only after applying the one-way hash functions 404 and 502.

In one embodiment, a value of the third key is used as the fourth key. In various embodiments, the fourth key has a value different from a value of the third key.

Figure 6:
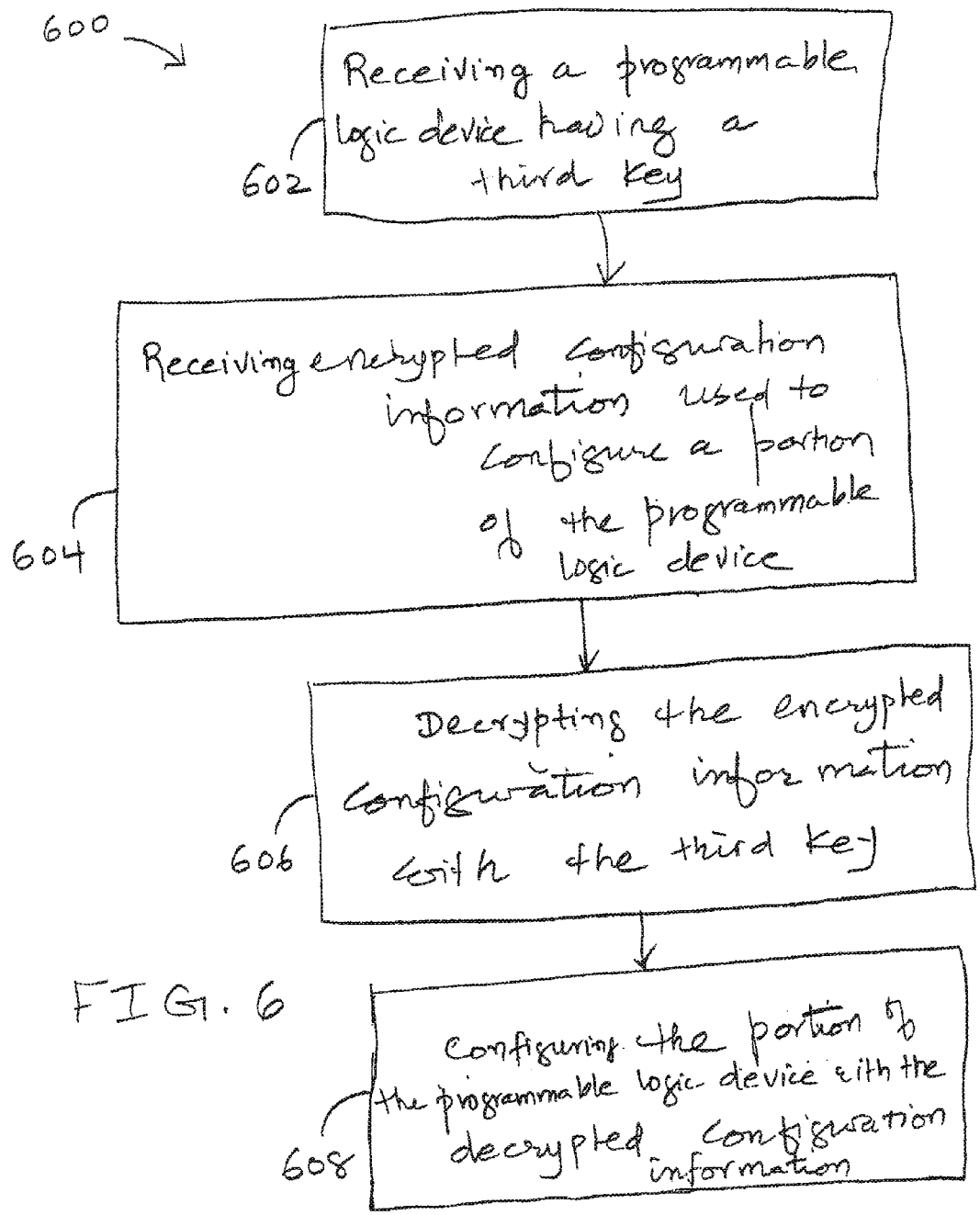
FIG. 6 is an exemplary method for using the third key to decrypt configuration information in accordance with one embodiment of the present invention.

As shown in FIG. 6, a method 600 for using the third key to decrypt configuration information, is described. At operation 602, the user 142 may receive customer device 108 having PLD 119 including the third key. The PLD 119 may be coupled to user computer 110 via user communication link 136. Moreover, user processor 128 may request the missing configuration information from customer processor 124 via network 114. The missing configuration information requested by user processor 128 may be used to configure PLD 119.

Customer processor 124 may encrypt the missing configuration information with an encryption key, such as a public key or a private key, and may send the encrypted configuration information via network 114 to user processor 128. The encryption key may be the same or different from a decryption key, which may be the third key. For example, if symmetric encryption is used, the encryption key is the same as the decryption key and if asymmetric encryption is used, the encryption key is different than the decryption key.

At operation 604, user processor 128 may receive the encrypted configuration information from customer processor 124 via network 114. Control block 120 may obtain the encrypted configuration information via a second path and the user communication link 136 from user computer 110. It is appreciated that the control block 120 may retrieve the third key from one or more registers 121. At operation 606, the control block 120 may decrypt the encrypted configuration information using the decryption key to recover decrypted configuration information.

It is noted that configurable fabric 122 can be configured only after successfully decrypting the encrypted configuration information with the decryption key. At operation 608, the control block 120 sends the decrypted configuration information via a third path to configure one or more of remaining portions of configurable fabric 122 with the missing configuration information for configuration thereof. It is appreciated that the only way to store the missing configuration information within PLD 119 is by receiving the encrypted configuration information via the second path, decrypting, using the control block 120 and the third key, the encrypted configuration information, and providing the decryption configuration information via the third path to configurable fabric 122. The second path and the third path are hardwired into PLD 119 by manufacturer 138.

In some embodiments, the first, second, and third paths are the same. In various embodiments, control block 120 may modify, such as scramble, the third key right after accessing the third key from one or more registers 121 to generate the decryption key, and may use the decryption key to decrypt encrypted configuration information. The scrambling function may be incorporated with a linear feedback shift register (LFSR) or as a hash function.

Figure 7:
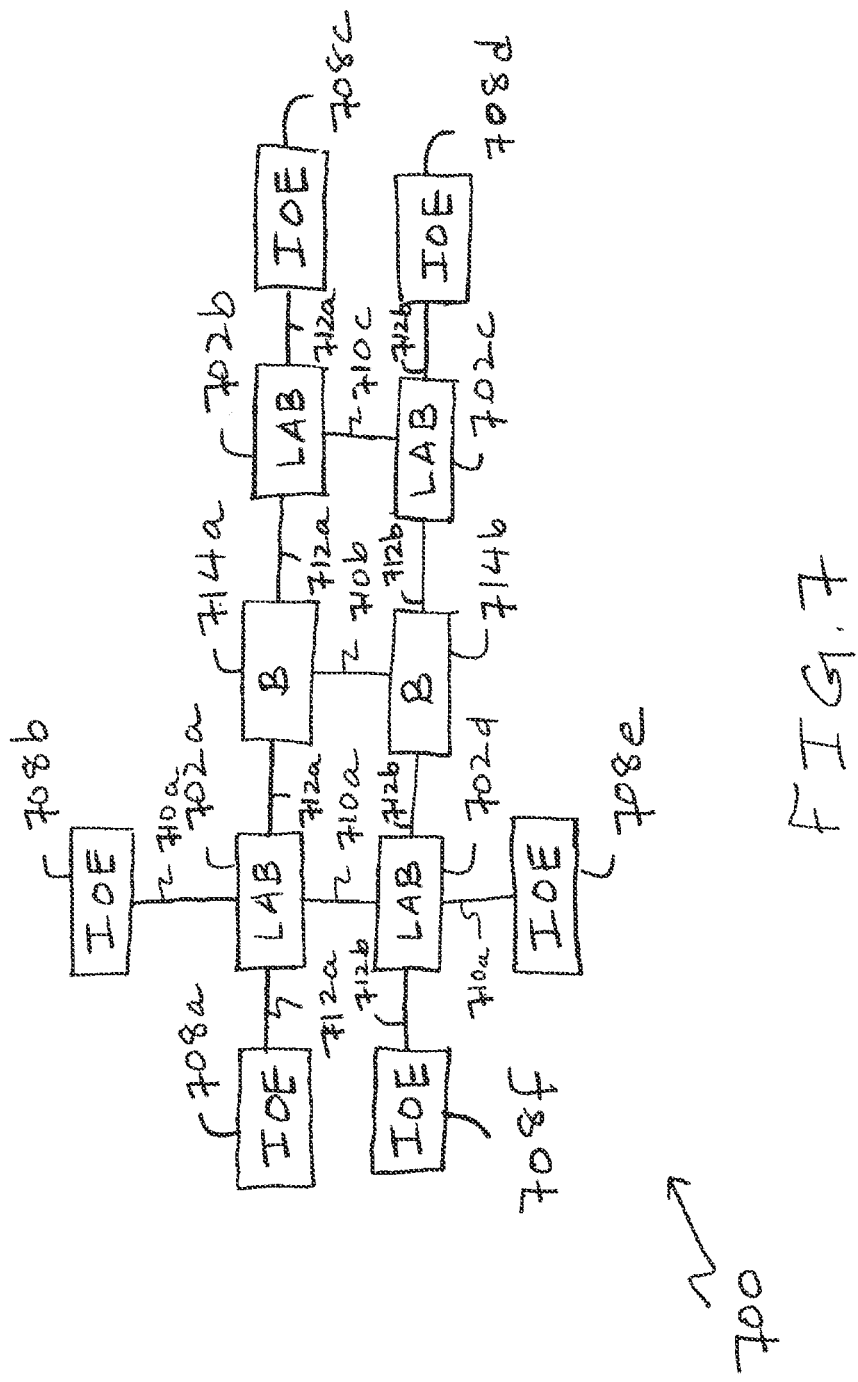
FIG. 7 is an exemplary fabric of a programmable logic device (PLD) in accordance with one embodiment of the present invention.

Referring to FIG. 7, a fabric 700 is an example of fabric 122. Fabric 700 may include a two-dimensional array of programmable logic array blocks (LABs) 702 that are interconnected by a network of multiple column interconnects 210 and multiple row interconnects 712 of varying length and speed. Any of the LABs 702, e.g., LAB 702c, can perform one or more functions, such as, digital signal processing (DSP), addition, multiplication, subtraction, etc. The network of column interconnects 710 and row interconnects 712 may include multiple switching circuits (not shown) that can be configured. LABs 702 may include multiple logic elements (LEs) (not shown) and each LE may include one or more registers (not shown). The LEs of one LAB 702a may be coupled to LEs of another LAB 702b via one or more of the switching circuits. A set of IO elements 708 may be located around the periphery of fabric 700 to support numerous single-ended and differential IO standards. Fabric 700 may further include a set of buffers (Bs) 714 that couple to LABs 702. The buffers 714 may be used to store data that is transferred between LABs 702. Fabric 700 may function synchronous or asynchronous with one or more clock signals received via a clock tree (not shown). The clock tree may be overlaid on the fabric 700.

Figure 8:
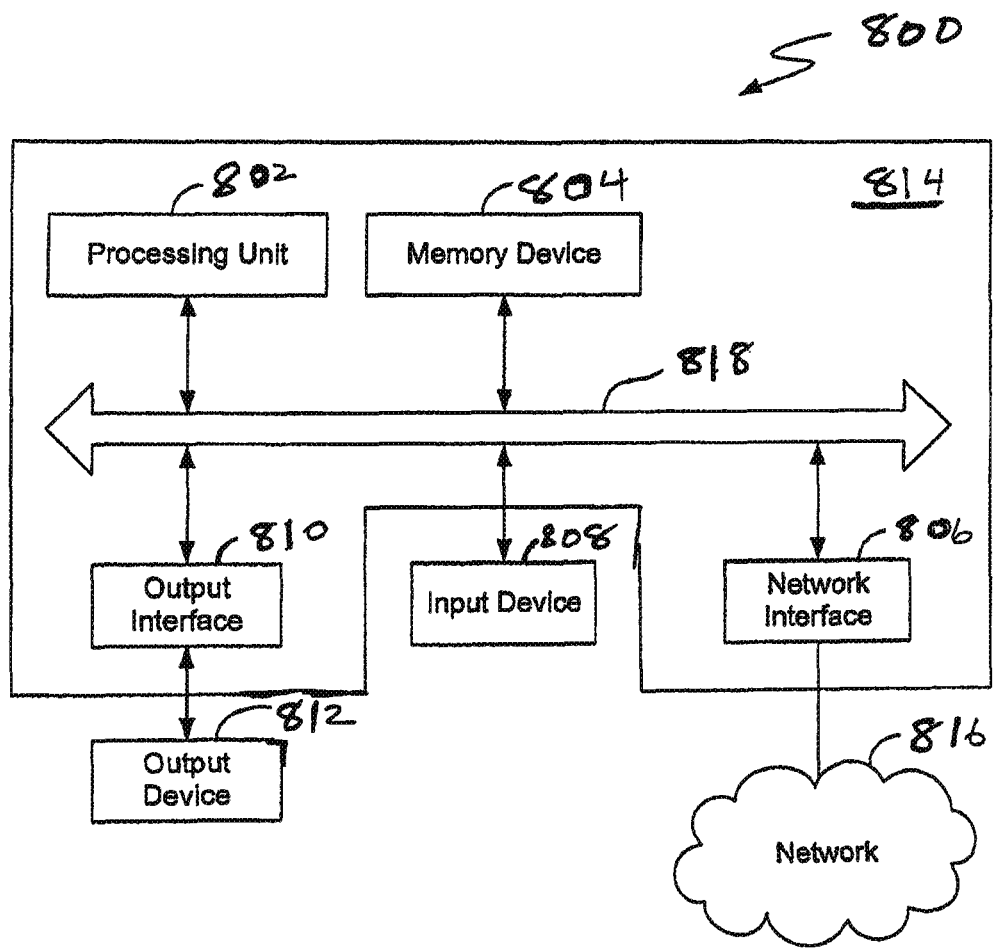
FIG. 8 is an exemplary computer system for executing a compilation method for generating configuration information used to configure the fabric in accordance with one embodiment of the present invention.

As shown in FIG. 8, a computer system 800 for executing a compilation method for generating configuration information used to configure the fabric 700 is described. The computer system 800 may include a processing unit 802, a memory device 804, a network interface 806, an input device 808, an output interface 810, and an output device 812. Computer system 800 may be an example of computer 102, 106, or 110 (FIG. 1). Network interface 806, output interface 810, memory device 804, and processing unit 802 may be located within a housing 814 of system 800. Processing unit 802 may be an example of processor 116, 124, or 128.

In some embodiments, processing unit 802 may be a central processing unit (CPU), a microprocessor, a floating point coprocessor, a graphics coprocessor, a hardware controller, a microcontroller, a programmable logic device programmed for use as a controller, or a network controller. Memory device 804 may be a RAM, a ROM, or a combination of RAM and ROM. For example, memory device 804 includes a computer-readable medium, such as a floppy disk, a ZIP™ disk, a magnetic disk, a hard disk, a compact disc-ROM (CD-ROM), a recordable CD, a digital video disc (DVD), blue-ray disk, Universal Serial Bus (USB) stick, or a flash memory. Memory device 804 stores a program code for performing the methods, described herein, for designing and configuring PLD 119 (FIG. 1) and/or for generating a key difficult to clone. Memory device 804 may be an example of memory 118, 126, or 130.

Network interface 806 may be a modem or a network interface card (NIC) that allows processing unit 802 to communicate with a network 816, which may be network 114 (FIG. 1). Processing unit 802 may be connected via a wireless connection or a wired connection to network 816. Examples of the wireless connection include a connection using Wireless Fidelity™ (Wi-Fi) protocol or a Worldwide Interoperability for Microwave Access (WiMax) protocol. The Wi-Fi protocol may be an Institute of Electrical and Electronics Engineers (IEEE) 702.11, IEEE 702.11a, IEEE 702.11b, IEEE 702.11g, or IEEE 702.11i protocol. Examples of input device 808 may include a mouse, a keyboard, a stylus, or a keypad. Output device 812 may be a liquid crystal display (LCD) device, a plasma display device, a light emitting diode (LED) display device, or a cathode ray tube (CRT) display device. Examples of output interface 810 include a video controller that drives output device 812 to display one or more images based on instructions received from processing unit 802.

Processing unit 802 accesses and executes the program code from memory device 804 or from a remote memory device (not shown) via network 816. Processing unit 802, memory device 804, network interface 806, input device 808, output interface 810, and output device 812 may communicate with each other via a bus 818. In alternative embodiments, system 800 may not include input device 808 and/or network interface 806.

Figure 9:
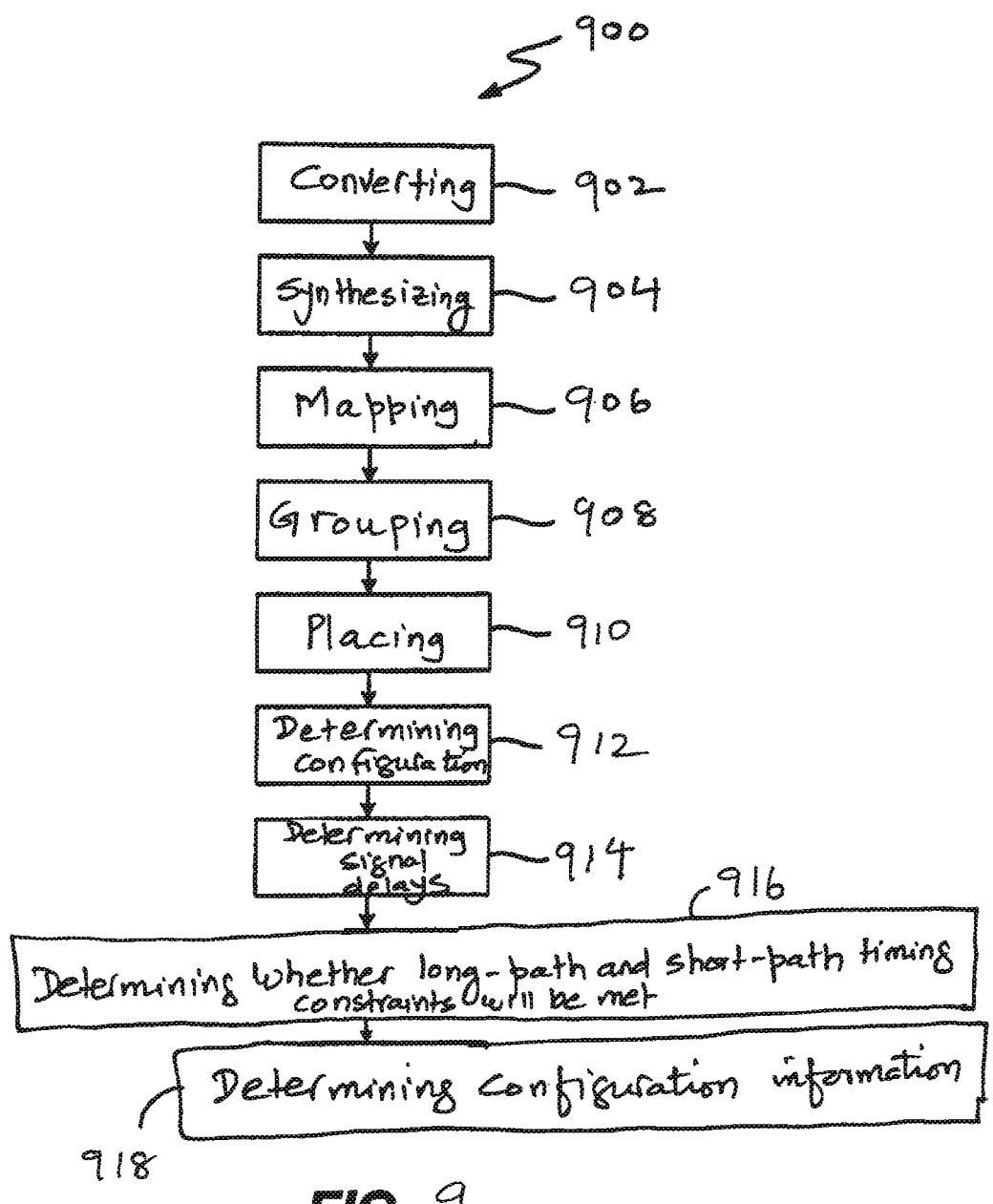
FIG. 9 is an exemplary compilation method in accordance with one embodiment of the present invention.

Referring to FIG. 9, a method 900 for creating a design of fabric 700 in accordance with one embodiment is shown. The created design may be subsequently used to generate configuration information for configuring the fabric 700. Processing unit 802 may access the program code, stored within memory device 804, for execution thereof in order to incorporate the method 900 in accordance with one embodiment.

Processing unit 802 may execute the program code for the method 900 to convert a user design in a given format, e.g., Hardware Description Language (HDL), into the configuration information. The fabric 700 is configured based on the configuration information in order to incorporate the user design.

At operation 902, a user design is converted into a register transfer layer (RTL) design of fabric 700. As an example, the RTL design may include a flow of signals between registers and logical operations that may be performed on the signals. At operation 904, the RTL design is synthesized into a set of logic gates. This set of logic gates may provide a synthesized design of fabric 700. At operation 906, the set of logic gates is mapped into a set of atoms. An atom is generally referred to irreducible constituents of a user design. The atoms may correspond to groups of logic gates and other components of the user design matching the capabilities of the LEs or other functional blocks of the fabric 700. The user design may be converted into any number of different sets of atoms, depending upon the underlying hardware of fabric 700 used to incorporate the user design.

Further, at operation 908, related atoms are grouped together to form clusters. At operation 910, the clusters of atoms are placed on multiple locations on fabric 700. At operation 912, configuration of the switching circuits of fabric 700 used to couple the atoms incorporating the user design is determined. At operation 914, multiple signal delays, e.g., data delays, for the sets of atoms and their associated connections in the switching circuits are determined by using a timing model of the fabric 700. At operation 916, it is determined whether the incorporation of the user design in fabric 700 will meet multiple long-path and short-path timing constraints. It is appreciated that in one embodiment, the timing constraints may be user specified via input device 808.

At operation 918, the configuration information is determined. The configuration information may include a configuration of each LE and the switching circuits used to couple the LEs. At operation 918, the configuration information is written in to a configuration file capable of being stored in the memory device 804 for access thereof. For example, the configuration file may be accessed by the processing unit 802 to configure the fabric 700.

It is appreciated that operations discussed herein within reference to flowcharts of FIGS. 2, 3, 6, and 9 may be performed in any convenient and appropriate order. Moreover, although the above-described embodiments are described with reference to control block 120, it is noted that multiple control blocks can be used instead. For example, a first one of the multiple control blocks decrypts the encrypted configuration information and a second one of the multiple control blocks creates the third key. All of the multiple control blocks reside in a portion of PLD 119 outside configurable fabric 122.

Although the foregoing systems and methods have been described in detail by way of illustration and example for purposes of clarity and understanding, it will be recognized that the above described systems and methods may be embodied in numerous other variations and embodiments without departing from the spirit or essential characteristics of the systems and methods. Certain changes and modifications may be practiced, and it is understood that the systems and methods are not to be limited by the foregoing details, but rather is to be defined by the scope of the appended claims.

What is claimed is:

1. A method comprising:
receiving, at a programmable logic device (PLD) that includes a first key hardwired in the PLD, a fourth key from a customer external to the PLD;
initiating a third key at the PLD to an initial value;
storing the initial value in a key register of the PLD;
applying a logic function to the initial value of the third key and the fourth key to generate a second key;
applying a first one-way hash function to the first key and the second key to generate an updated value of the third key;
replacing, in the key register, the initial value of the third key with the updated value of the third key;
setting the updated value of the third key as an encryption/decryption key of the PLD
receiving encrypted configuration information at the PLD;
generating decrypted configuration information by decrypting the encrypted configuration information with the encryption/decryption key of the PLD; and
configuring the PLD with the decrypted configuration information; wherein:
applying the first one-way hash function to the first key and the second key to generate the updated value of the third key includes one or more of:
concatenating the first key with the second key to generate a concatenated input, and applying the hash function on the concatenated input;
concatenating the second key with the first key to generate a concatenated input, and applying the hash function on the concatenated input;
hashing the first key to obtain a first output and concatenating the first output with the second key; and
hashing the second key to obtain a second output and concatenating the second output with the first key.

2. The method of claim 1 further comprising storing the third key in the one or more components hardwired in the PLD.

3. The method of claim 1, wherein the first key comprises a constant or a series of constants.

4. The method of claim 1, wherein a plurality of PLDs within a same family use the first key.

5. The method of claim 4 wherein the first key is unique to each PLD.

6. The method of claim 1, wherein the PLD comprises a field programmable gate array (FPGA) or an Application Specific PLD (ASIC).

7. The method of claim 1 further comprising receiving the fourth key via a hardwired path of the PLD prior to said creating the third key.

8. The method of claim 1, wherein the PLD comprises one or more integrated circuits.

9. The method of claim 1, wherein a control block of the PLD includes the one or more components.

10. A method comprising:
receiving encrypted configuration information;

communicating the encrypted configuration information via a hardwired path to one or more components of a programmable logic device (PLD);

retrieving a decryption key from a control block of the PLD;

decrypting the encrypted configuration information using the decryption key to generate decrypted configuration information; and configuring the PLD with the decrypted configuration information, wherein the decryption key includes a third key or a modified version of the third key, the third key having been created by using one or more components hardwired in the PLD to:

initiate the third key to an initial value;

store the initial value in a key register of the PLD;

apply a logic function to the initial value of the third key and a fourth key to generate a second key, the fourth key having been received from a customer external to the PLD;

apply a first one-way hash function to a first key and the second key to generate an updated value of the third key;

replace, in the key register, the initial value of the third key with the updated value of the third key; wherein using one or more components hardwired in the PLD to apply a first one-way hash function to the first key and the second key includes one or more of:

concatenating the first key with the second key to generate a concatenated input, and applying the hash function on the concatenated input;

concatenating the second key with the first key to generate a concatenated input, and applying the hash function on the concatenated input;

hashing the first key to obtain a first output and concatenating the first output with the second key; and hashing the second key to obtain a second output and concatenating the second output with the first key.

11. The method of claim 10, wherein the PLD comprises one or more integrated circuits.

\* \* \* \* \*